(12) United States Patent
Weare

(10) Patent No.: US 7,599,916 B2
(45) Date of Patent: Oct. 6, 2009

(54) SYSTEM AND METHOD FOR PERSONALIZED SEARCH

(75) Inventor: Christopher B. Weare, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 371 days.

(21) Appl. No.: 11/109,950

(22) Filed: Apr. 20, 2005

(65) Prior Publication Data

US 2006/0242135 A1    Oct. 26, 2006

(51) Int. Cl.
*G06F 17/30* (2006.01)
(52) U.S. Cl. .................. 707/3; 707/1; 707/4; 707/5
(58) Field of Classification Search .................. 707/1–5
See application file for complete search history.

(56) References Cited

U.S. PATENT DOCUMENTS

| | | | | |
|---|---|---|---|---|
| 5,826,261 A * | 10/1998 | Spencer | .................. | 707/5 |
| 6,263,332 B1 * | 7/2001 | Nasr et al. | .................. | 707/5 |
| 6,564,213 B1 * | 5/2003 | Ortega et al. | .................. | 707/5 |
| 6,701,307 B2 * | 3/2004 | Himmelstein et al. | .......... | 707/3 |
| 7,146,359 B2 * | 12/2006 | Castellanos | .................. | 707/5 |
| 2002/0198875 A1 * | 12/2002 | Masters | .................. | 707/4 |
| 2004/0064334 A1 * | 4/2004 | Nye | .................. | 705/1 |
| 2005/0071328 A1 * | 3/2005 | Lawrence | .................. | 707/3 |
| 2005/0222989 A1 * | 10/2005 | Haveliwala et al. | .................. | 707/3 |
| 2006/0026013 A1 * | 2/2006 | Kraft | .................. | 705/1 |
| 2006/0149774 A1 * | 7/2006 | Egnor | .................. | 707/102 |
| 2006/0197763 A1 * | 9/2006 | Harrison et al. | .................. | 345/441 |
| 2008/0010253 A1 * | 1/2008 | Sidhu et al. | .................. | 707/3 |

* cited by examiner

*Primary Examiner*—Don Wong
*Assistant Examiner*—Thanh-Ha Dang
(74) *Attorney, Agent, or Firm*—Shook, Hardy & Bacon L.L.P.

(57) ABSTRACT

A system and method for incorporating user preferences into a document search is provided. User events are associated with one or more content tags based on a comparison of the user event with locations in a content space. The user events are tracked to provide a user event history. The user event history is analyzed to select content tags that correspond to user preferences. A search query is modified to include one or more selected content tags. The search query is then matched to documents associated with content tags contained in the search query.

20 Claims, 5 Drawing Sheets

SYSTEM AND METHOD FOR PERSONALIZED SEARCH

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to a method for performing context based keyword document searching.

BACKGROUND OF THE INVENTION

Search engines are a commonly used tool for identifying desired documents from large electronic document collections, including the world-wide internet and internal corporate networks. Conventional search methods typically use keyword searches to identify relevant documents. Documents that match more keywords within a search are often considered more desirable. These documents are typically returned at the beginning of the list of search results.

One limitation of keyword searching is the difficulty in providing a context for the keywords. For example, consider a search query containing the word "pizza." Documents that typically contain this word also have other words in common such as "delivery", "pepperoni", "sauce", "restaurant" etc. However, it is quite possible that there are documents that contain the word "pizza" prominently, but have nothing to do with the more common use of the word pizza. For instance, a new software technology called "pizza" might be invented by a startup and, therefore, be featured prominently on that companies web page. If this invention is new and not well known then this use of the word "pizza" will not be the likely intent of users when they enter the query pizza, so the results for this search query should not feature this page prominently. Unfortunately, a conventional search engine does not have the ability to distinguish between the new, uncommon usage of the word "pizza" and the usage that is probably desired by the person submitting the search query.

One way to provide context for a keyword search is by adding additional keyword search terms. However, the person submitting a search query may be either unwilling or unable to add enough keywords to provide context for the search. Additionally, simply adding one or more keywords may not adequately represent the true content a user is interested in finding.

In a paper titled "Self Organization of a Massive Document Collection", (IEEE Transactions on Neural Networks, Vol. 11, No. 3, May 2000, page 574), a method is provided for constructing a self-organized 2-dimensional map to categorize documents. The categorized documents can be keyword searched. Additionally, the individual map units are indexed based on any keywords contained within the map unit.

What is needed is a system and method of performing keyword searches that incorporate a user's likely interests. The search system and method should be able to determine a user's likely interests based on past activity by the user. Based on the user's interests, the search system and method should be able to provide search results sorted to match the likely intended context for a search while maintaining a response time similar to the response times of conventional search methods. The system and method should also be able to store the information regarding a user's interests in a compact manner. Additionally, the system and method should be compatible with conventional search techniques.

SUMMARY OF THE INVENTION

This invention provides a system and method for performing keyword searches that incorporate user preferences while maintaining fast response times. The system and method are compatible with existing search engine technology.

In an embodiment, the invention provides a method for performing a search that incorporates user preferences. A plurality of user events for a user are associated with content tags. Note that the user events can correspond to previous documents accessed by a user, previous search queries submitted by a user, or other types of user activity. After associating user events with content tags, a search query is received from the user. One or more of the associated content tags are then selected. The selected content tags are used to modify the received search query. This modified query is then matched, using a search engine, with one or more documents that are associated with at least one of the selected content tags.

In an embodiment, selecting content tags for inclusion in the modified query can comprise calculating a preference value for some or all potential content tags. Content tags with a preference value higher than a determined threshold can then be used to modify the query. Preferably, the preference value calculation can be based on the position of content tags corresponding to recent user events in a storage queue and/or the frequency of occurrence of content tags corresponding to user events.

In another embodiment, the invention provides a method for performing a document search that incorporates user preferences based on a user event history. A user event history comprising a plurality of stored content tags is provided. The user history is analyzed to select one or more of the stored content tags. A search query is then modified to include the one or more selected content tags. The modified search query is matched to with one or more documents associated with at least one of the selected content tags.

In still another embodiment, the invention provides a system for performing context based document searches. The system includes a grid builder for constructing a grid of content tiles; a content tag assignment mechanism for assigning content tags to content tiles; a feature association mechanism for determining feature values for a document and associating the document with one or more content tiles; a user event tracker for maintaining a history of content tags corresponding to user events; and a keyword matching mechanism for matching a document associated with a content tag with a search query. Preferably, the user event tracker is also capable of selecting content tags that correspond to user preferences.

DETAILED DESCRIPTION OF THE EMBODIMENTS

I. Overview

This invention provides a system and method for performing a keyword search of electronic documents that incorporates a user's interests. Rather than simply identifying documents containing one or more keywords present in a search query, the invention allows a search engine to identify documents that match the likely intent of a user submitting a search query.

In various embodiments, the invention provides keyword searching that incorporates user preferences by accumulating information about the previous activity or user events of the user. Information about a user's preferences is accumulated by tracking user events. User events can include search queries submitted by a user and/or documents viewed by a user. Each user event can be associated with an amount of subject matter or a location in a content space. The subject matter can be characterized in any convenient manner, such as using a content grid which spans a region of content space, or by assigning subject matter to nodes (locations) in a subject matter tree. In order to identify an amount of subject matter, each discrete amount of subject matter can be assigned a content tag. The content tags are character strings that can be interpreted by a search engine as a keyword.

By associating each user event with one or more content tags, the subject matter a user is interested in can be tracked and accumulated. The accumulated information is used to select one or more content tags that are representative of the user's preferences. A search query received from the user is then modified to incorporate the selected content tags. A document search is then conducted using this modified search query.

In an embodiment, all content tags from all previous user events can be selected for inclusion in a search query received from a user. In other embodiments, a subset of the content tags can be selected for inclusion in a search query. For example, content tags can be selected based on how recently a user even occurred. In another embodiment, content tags corresponding to the most frequently occurring user events can be selected.

In the examples below, the invention will be described in an embodiment where a content space is spanned by one or more content grids. However, those of skill in the art will recognize that content tags can be associated with subject matter in any convenient manner.

II. General Operating Environment

Figure 1:
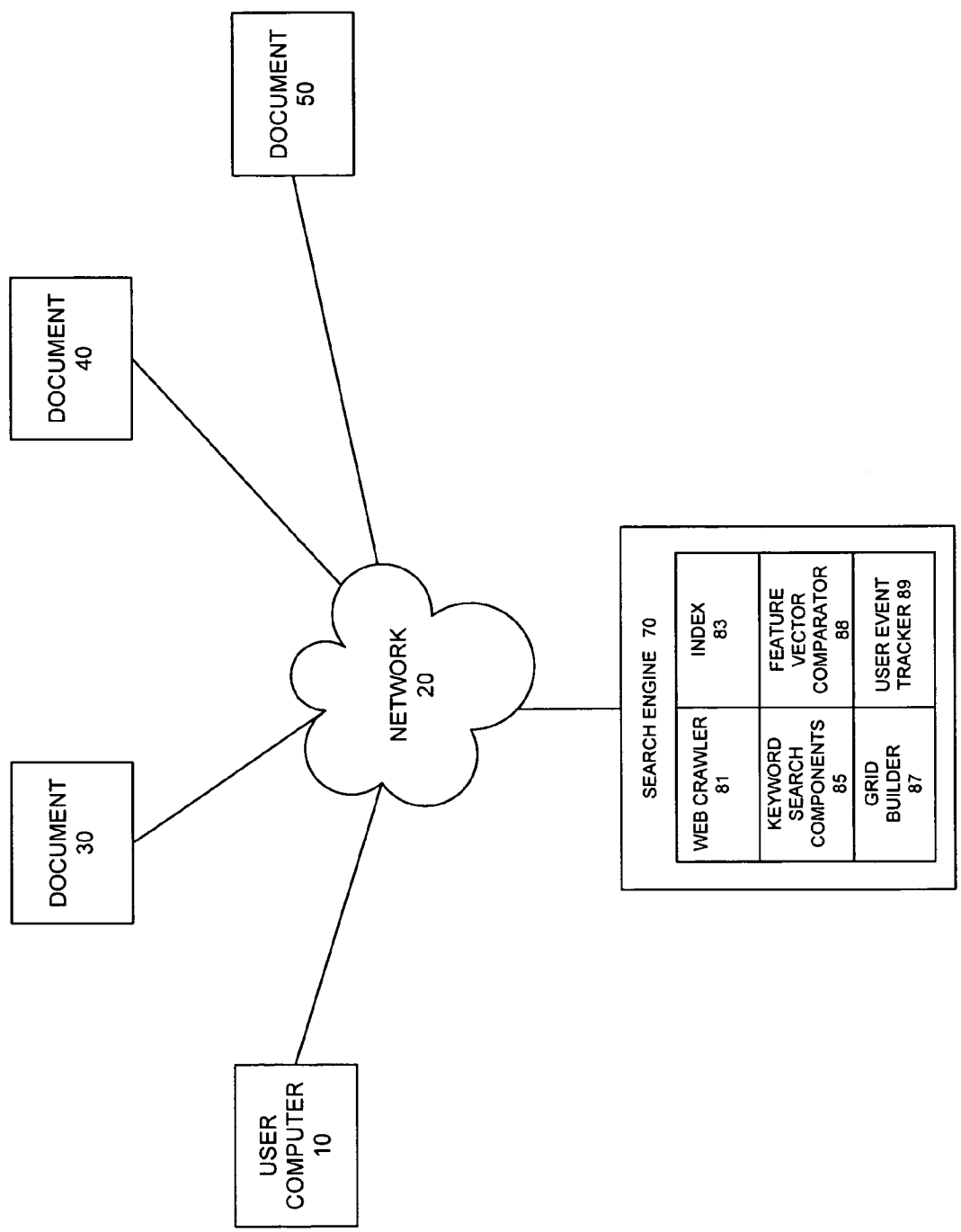
FIG. 1 is a block diagram illustrating an overview of a system in accordance with an embodiment of the invention.

FIG. 1 illustrates a system for performing keyword searches that incorporate user preferences according to an embodiment of the invention. A user computer 10 may be connected over a network 20, such as the Internet, with a search engine 70. The search engine 70 may access multiple web sites 30, 40, and 50 over the network 20. This limited number of web sites is shown for exemplary purposes only. In actual applications the search engine 70 may access large numbers of web sites over the network 20.

The search engine 70 may include a web crawler 81 for traversing the web sites 30, 40, and 50 and an index 83 for indexing the traversed web sites. The search engine 70 may also include a keyword search component 85 for searching the index 83 for results in response to a search query from the user computer 10. The search engine 200 may also include a grid builder 87 for constructing a grid of concept tiles, training the series of feature values associated with the concept tiles, and assigning concept tags to the concept tiles. Alternatively, grid builder 87 can be a separate program. A feature vector comparator 88 may be included to associate documents with one or more concept nodes. The feature vector comparator 88 can also associate a search query with corresponding concept nodes. Additionally, a user event tracker 89 can be included for associating content tags with user events and storing the content tags. User events can include documents viewed by a user or search queries submitted by a user. Optionally, user event tracker 89 can also be a separate program.

Figure 2:
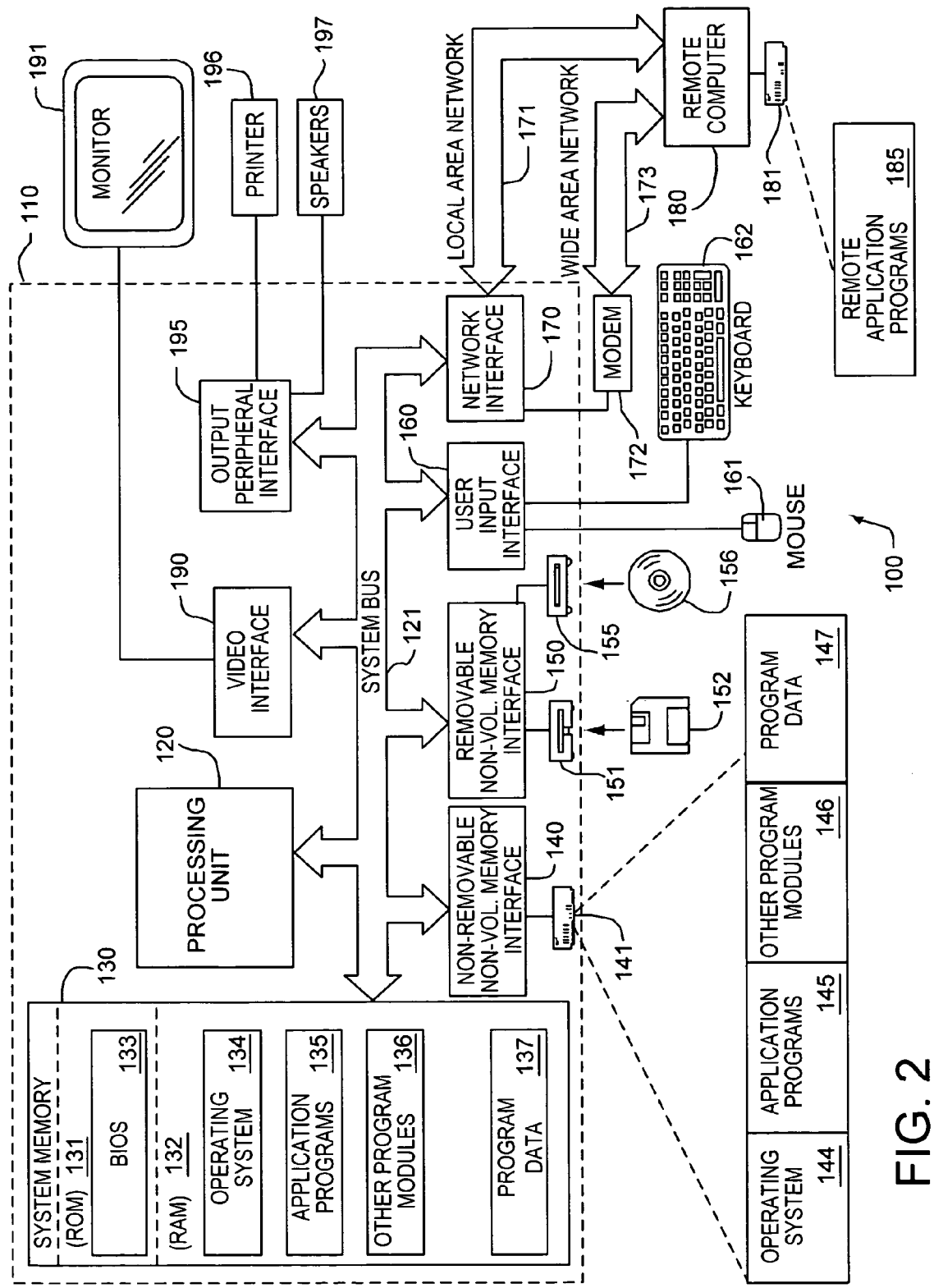
FIG. 2 is block diagram illustrating a computerized environment in which embodiments of the invention may be implemented.

FIG. 2 illustrates an example of a suitable computing system environment 100 for implementing keyword searching that incorporates user preferences according to the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Searching Training Documents to Identify Word Phrase Basis Vectors

In an embodiment where user events are associated with content tags corresponding to a content grid, a precursor step to performing the method of the invention is identifying words and word phrases that will used in determining feature values for documents and the grid content tiles (or content space locations). Each document and grid content tile will be associated with a series of feature values. These associated feature values indicate the subject matter associated with a document or grid content tile. Preferably, these feature values can be conveniently represented as a feature vector. In embodiments where feature values are represented as feature vectors, the words and word phrases that serve as basis vectors must be identified. In this invention, a word represents a searchable string of characters (in other words, a potential search keyword). A word phrase represents two or more keywords separated by a space. In preferred embodiments, the basis vectors include words, word phrases containing two words (word pairs), and word phrases containing three words (word triplets).

The words and word phrases used as basis vectors can be identified by any convenient method. In an embodiment, the basis vectors can be selected from a previously determined list of words and word phrases. In another embodiment, the basis vectors are determined by analyzing the words and word phrases found in a group of training documents. The training documents can be any document collection that can be keyword searched. Preferably, the training documents are representative of a desired searchable document collection, (i.e. the collection of documents that will be searched when a user submits a search query). In an embodiment, at least a portion of the training documents are included in the searchable document collection. In another embodiment, the number of training documents is at least 0.05%, or at least 0.1%, or at least 0.5%, or at least 1.0% of the total number of documents in the searchable document collection.

For a word or word phrase to be useful as a search term, the word or word phrase should appear preferentially in a small subset of the training documents. For example, if a word or word phrase appears in one or only a few of the training documents, the word or word phrase is likely to be helpful as a search term. Similarly, a word that appears in many documents, but a large number of times in only a few documents, may also be an effective search term. One way to identify such words and word phrases in the training documents is to determine a "keyword value" for a word or word phrase. A keyword value for a word phrase can be determined, for example, by comparing the frequency of occurrence for a word or word phrase in an individual document with the average frequency of occurrence in all documents. This provides a numerical keyword value for a given word or word phrase in a single document. A word or word phrase that has a high keyword value in one or more documents is likely to be a good choice as a basis vector. In an embodiment, the keyword value can be expressed as a numerical value, and words or word phrases having keyword values that are higher than a predetermined threshold can be selected as basis vectors. Those of skill in the art will recognize that many possible keyword values could be calculated.

In an embodiment, the keyword value for each word or word phrase in each document is generated using the following formula:

$$P_{ij} = tf_{ij} \log\left(\frac{N}{dc_j}\right)$$

where $P_{ij}$ is the numerical value for word or word phrase "j" in document "i" of the document collection, $tf_{ij}$ is the total frequency of occurrence for word or word phrase "j" in document "i", N is the total number of documents in the collection, and $dc_j$ is the number of documents containing the word or word phrase "j".

For a word or word phrase "j," the keyword value $P_{ij}$ is calculated for each document "i" in the training document collection. Note that this requires calculation of both the number of occurrences of a word "j" in the document "i" as well as calculation of the total number of documents containing the word "j". The maximum $P_{ij}$ value for the word or word phrase is then compared with a predetermined threshold value. If the maximum $P_{ij}$ value is greater than the predetermined threshold, the word or word phrase is selected to be part of the document feature vector. Note that based on the above formula, a word that appears in every document in a collection will always have a $P_{ij}$ value of zero, because when $dc_j$=N, the logarithm term will become zero. Thus, even if a word "j" appears an unusually large number of times in only a few documents, at least some documents in the collection must not contain the word in order to get a non-zero $P_{ij}$ value. By contrast, as a document collection becomes larger, the possible value of the logarithm term will increase. Thus, the larger the document collection is, the larger the maximum $P_{ij}$ value will be for a word that appears in only one document.

In an embodiment, the training documents are first analyzed to determine the $P_{ij}$ values for all single words in all documents. The process is then repeated for all word pairs and word triplets in the training documents.

IV. Constructing a Feature Vector

After identifying the words and word phrases that are useful as search keywords, a series of feature values can be determined for each training document. In other words, once the number of basis vectors (words and word phrases) has been determined, a feature vector can be created for each training document. A feature vector is a multi-dimensional vector having a number of dimensions equal to the number of basis vectors. Because the basis vectors represent words and word phrases, in an embodiment the numerical coefficients of a feature vector are based on the frequency of occurrence of a word or word phrase in a document.

In an embodiment, the feature vector for each document "i" is defined as $$\overline{D}_j = \sum tf_{ij} \log\left(\frac{N}{dc_j}\right) \cdot \hat{w}_j$$

where $tf_{ij}$ is the number of times word "j" appears in document "i," N is the total number of documents in the collection, $dc_j$ is the number of documents in the entire collection that contain the word "j," and $\hat{w}_j$ is the unit vector for word "j" defined as:

$$\hat{w}_k \cdot \hat{w}_l = \begin{cases} 1, k = l \\ 0, k \neq l \end{cases}$$

Although the formula for keyword value is incorporated into the above definition for the feature vector, in another embodiment the feature vector can be defined independently of the keyword value.

In an embodiment where the basis vectors may be composed of words, word pairs, and word triplets, the feature vector is constructed by first searching a document to identify all occurrences of single word basis vectors. The document is then searched to determine all two word basis vectors, and finally all three word basis vectors. In another embodiment, a document may be searched to identify the basis vectors in any convenient order.

V. Forming Concept Grids and Concept Tiles

In embodiments where content tags are associated with content nodes corresponding to a content grid, another precursor step to performing the method of the invention is the formation of at least one grid that spans concept space. Preferably, the grid is a 2-dimensional grid. The concept grid is composed of grid elements or concept tiles, which can be any combination of shapes which fill a concept space. In an embodiment, the concept tiles can be triangles, squares, parallelpipeds, hexagons, or any other regular, space-filling shape in 2 dimensions. In another embodiment, the concept tiles can have multiple shapes and dimensions that lead to filling of a 2-dimensional space. In yet another embodiment, the concept grid spans a 3-dimensional space. In such an embodiment, the concept tiles preferably have regular 3-dimensional shapes, such as cubes.

Because the concept tiles are arranged to fill a selected space, each concept tile will have a list of "nearest neighbor" concept tiles. In an embodiment, the nearest neighbor concept tiles are the group of tiles that share a common boundary with a give concept tile. For example, in a 2-dimensional grid with square concept tiles of uniform size, each concept tile will have a total of eight nearest neighbor tiles. Similarly, in a grid of regular hexagons of uniform size, each concept tile will have six nearest neighbor tiles. In some embodiments, concept tiles located at the edge of a grid may have a lower number of nearest neighbors. In alternative embodiments, the grid can be constructed to have a toroidal shape which eliminates the edge of the grid along one dimension. For example, in a 2-dimensional grid having 4 edges (i.e., top, bottom, left, and right), the concept tiles on the left edge would be adjacent to the concept tiles on the right edge. Thus, a concept tile located on the right edge of the grid, would include concept tiles from the left edge of the grid in the nearest neighbor list, and vice versa. Those of skill in the art will recognize that other special cases can arise at the edges of the grid.

The number of concept tiles in a concept grid can vary. In an embodiment, the number of concept tiles is selected based on the number of basis vectors found in a set of training documents.

During or after formation of a grid, concept tags are assigned to the concept tiles. A concept tag is a text string that identifies a concept tile within a grid. The text string can be any combination of characters that can be used as a search term in a search query. In preferred embodiments the concept tag includes identifying information about the concept tile. For example, the concept tag can include information about which grid the concept tile is in, the size of the concept tile, the shape of the concept tile, and the location of the concept tile in the grid.

Figure 3:
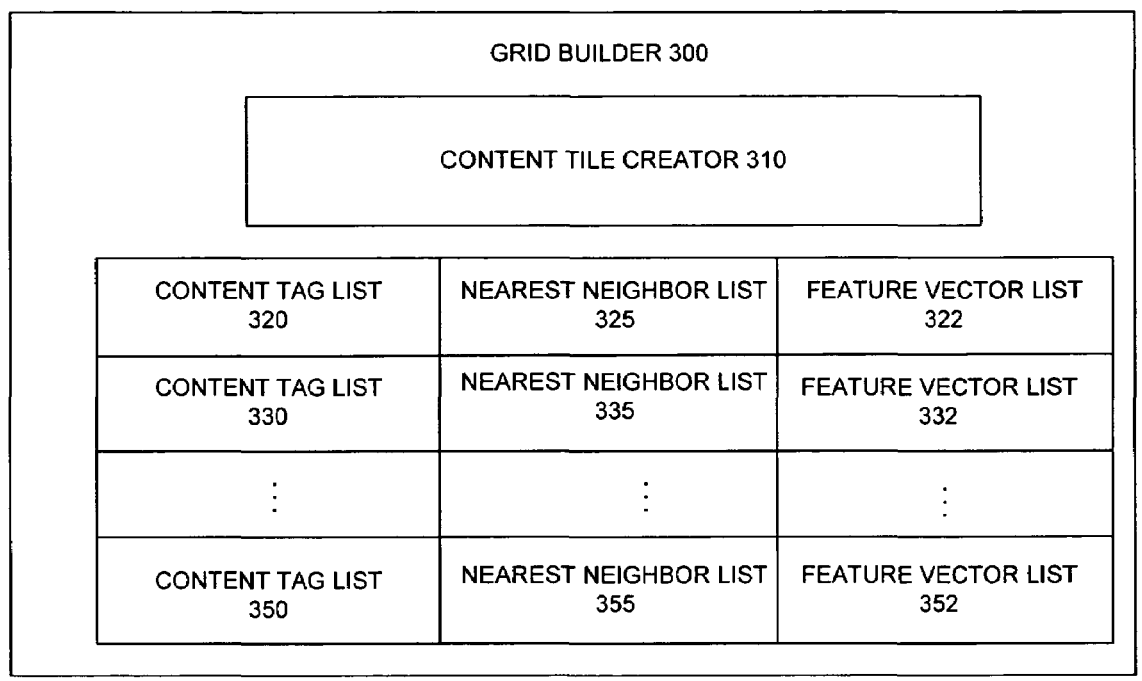
FIG. 3 is a block diagram of a concept grid construction module in accordance with an embodiment of the invention.

FIG. 3 schematically depicts a grid builder 300 according to an embodiment of the invention. Grid builder 300 includes a content tile creator 310 for constructing the initial space-filling grid of content tiles. In an embodiment, grid builder 300 also includes one or more pairs of concept tag lists and nearest neighbor lists. A concept tag list (such as concept tag list 320, 330, and 350) contains the concept tag identifiers for each content tile in a single grid. In an alternative embodiment, a single concept tag list could contain all location tags for multiple grids. A nearest neighbor list (such as nearest neighbor list 325, 335, and 355) provides a listing of the nearest neighbor content tiles for each concept tile in a grid. Although the concept tag lists and nearest neighbor lists are shown here as data structures, in another embodiment the concept tag for a content tile and the nearest neighbor content tiles can be calculated as needed. In such an embodiment, the creation of concept tags for the concept tiles conforms to a pattern so that the concept tag can be determined using an algorithm. For example, if multiple grids are desired that each span the same concept space but with different resolution, the concept tags for concept tiles in lower resolution grids may be calculated based on the concept tags of a corresponding concept tile in a higher resolution grid. In still another embodiment, grid builder 300 includes a grid feature vector list (such as feature vector list 322, 332, and 352.) The grid feature vector list contains the coefficients for the feature vector corresponding to each content tile in the grid.

In an embodiment, multiple grids can be constructed that cover the same content space. The multiple grids can have the same or different starting points. The grids can also have different sizes and shapes for the location tiles. For example, multiple grids for a content space could be constructed to have content tiles with differing resolutions. A grid with smaller content tiles could have square tiles that correspond to half of the grid size of the content tile in the next larger grid. This would cause 4 squares in the smaller grid to correspond to one square of the next larger grid. This pattern can be repeated to create successively larger grids.

In an exemplary embodiment, three grids can be constructed to cover the same concept space. In the highest resolution grid, one of the content tiles corresponds to a tile location that is in the $47^{th}$ row and the $65^{th}$ column. The lower resolution grids are each a factor of 4 lower in resolution. In other words, one of the lower resolution grids contains only ¼ as many tiles as the highest resolution grid, while the other grid contains only ¹⁄₁₆ as many tiles as the highest resolution grid. In this embodiment, the concept tags for the concept tiles corresponding to tile 47, 65 in the highest resolution grid are ct001x0047y0065 ct004x0011y0016 ct016x0002y0004

The "ct" indicates that the grid is a concept space grid. The next 3 numbers indicate the size of the individual concept tiles, with smaller tiles corresponding to higher resolution. The four digits following the "x" represent the tile number along one direction (such as a row or the x direction). Similarly, the four digits following the "y" represent the tile number along a second direction (such as a column or the y direction). Note that the tile number of tiles in the lower resolution grids can be determined by dividing the tile number of the higher resolution grid by the size number for tiles in the lower resolution grid.

VI. Training the Feature Vectors

After constructing a grid in concept space, the grid feature vectors corresponding to the content tiles are trained. The training of the grid feature vectors can be conducted using any algorithm suitable for forming a self-organizing map. Training the feature vectors should cause content tiles that are closer to each other to have similar or related content.

In an embodiment, training of the grid feature vectors begins by assigning initial values to the coefficients for each grid feature vector. Any convenient set of initial coefficients can be assigned. In an embodiment, the coefficients of the grid feature vectors are seeded with small random values. In another embodiment, the coefficients of the grid feature vectors can be sparsely populated, so that only a few coefficients have non-zero values in each initial feature vector.

In an embodiment, after assigning the initial coefficients for the grid feature vectors, the grid feature vectors are trained using the document feature vectors for the training documents. To train the grid feature vectors, the feature vector for a document is compared with each of the grid feature vectors. The grid feature vector with the most similarity to the document feature vector is identified. This identified grid feature vector is modified to more closely resemble the document feature vector. The grid feature vectors for the nearest neighbor content tiles are also modified (to a lesser degree) to more closely resemble the document feature vector. This process is repeated until the feature vectors for all documents in the training collection. At this point, one iteration of training is complete.

In a preferred embodiment, the comparison of a document feature vector with a grid feature vector comprises determining a mathematical dot product of the grid feature vector and a document feature vector. A dot product provides a convenient comparison tool, as the grid feature vector that is most similar to a training document feature vector will produce the highest dot product value. After identifying the most similar grid feature vector, the grid feature vector is modified to move proportionally closer to the document feature vector. In an embodiment, the difference between the grid feature vector and the document feature vector is determined. A percentage of this difference is then added into the grid feature vector. The percentage of the difference added to the grid feature vector is referred to as the learning rate. In an embodiment, the learning rate can be 10% or less, or 5% or less, or 3% or less, or 1% or less. In another embodiment, the learning rate decreases during the course of training, such as after a predetermined number of training iterations.

In addition to modifying the grid feature vector with the highest dot product value, other nearby grid feature vectors are also modified. Modifying the grid feature vectors of neighboring content tiles allows nearby content tiles to correspond to related subject matter. In an embodiment, the grid feature vectors for each nearest neighbor content tile are modified in the same manner as described above, but preferably with a lower learning rate. In another embodiment, grid feature vectors for nearby content tiles are modified based on a Gaussian (or other function) profile for the learning rate. In such an embodiment, the number of nearby content tiles modified depends on the rate of drop-off of a Gaussian function. The width of the Gaussian function can also vary during the course of training if desired.

After multiple iterations, the grid feature vectors should converge on a stable solution. Convergence can be detected based on the amount of change in the grid feature vectors after a full iteration of training. If there is no change or a sufficiently small change in the grid feature vectors between consecutive iterations, the grid feature vectors are considered converged.

VII. Pre-Searching a Document Collection

Once the grid feature vectors for a content grid are converged, a pre-search can be performed on a group of searchable documents to determine which documents should be associated with which content tiles. Pre-searching documents allows computationally expensive steps, such as forming document feature vectors, to be performed before a user enters a search query. Additionally, the type and number of searchable keywords in a document can also be identified and stored for later use.

In an embodiment of the invention, performing a pre-search includes creating a feature vector for all documents available in a searchable document collection. The feature vectors are preferably constructed in the same manner as described above. Note, however, that a searchable document collection will typically contain more documents than a training document collection. As a result, the feature vector for a document in a training document collection may not be the same as the feature vector for an identical document in a searchable document collection.

After determining a feature vector for each document in a searchable document collection, the document feature vectors are used to determine which content tiles, if any, should be associated with a document. A vector dot product is calculated for the document feature vector with each grid feature vector. For each dot product value that is greater than a predetermined threshold, the corresponding content tile is associated with the document. In other words, if a document has a threshold amount of similarity to the content represented by a content tile, the document is associated with the content tile. In an embodiment, associating a document with a content tile comprises associating the document with the content tag for the content tile.

In various embodiments, multiple grids are constructed that correspond to the same content space, with each grid having successively larger content tiles. The grids with successively larger content tiles are effectively lower resolution grids, with a single lower resolution content tile corresponding to multiple higher resolution content tiles. In such an embodiment, during a pre-search the document feature vectors would be compared with the grid feature vectors for the content grid with the highest resolution. When a content tile from this highest resolution grid is associated with a document, the corresponding content tiles from each of the lower resolution grids can also be associated with the document.

In an embodiment, the results of the pre-search, such as the association of content tiles with documents, are stored in a manner that allows for easy retrieval of data when responding to a search query. One example of a data structure suitable for storing pre-search results is an inverted index. An inverted index is a list of potential searchable terms or keywords, and a list of documents that contain those keywords. When a document is pre-searched, the document is associated with each keyword present in the document. The search terms can be individual words, groups of words, or any other string of characters that can be used as part of a search query. When a search term is subsequently used in a search query, the search term can be quickly found in the inverted index. Each document associated with the search term is returned as a match. In various embodiments of this invention, the inverted index is also used to associate documents with the content tags of content tiles. Because the content tags have the form of a keyword, the content tag for each content tile can be included in the inverted index just like any other keyword. When a document is associated with a content tile, the inverted index is updated to associate the document with the location tag for that content tile.

The process of pre-searching documents continues until all desired searchable documents have been searched and associated with terms in the inverted index. The inverted index is now ready for use in responding to search queries. To maintain the inverted index, the process of pre-searching documents and associating documents with content tiles can be repeated periodically, such as daily, or weekly, or monthly, or yearly. In another embodiment, the inverted index can be updated according to any convenient schedule. In still another embodiment, the inverted index can be updated based on the occurrence of an event, such as when a sufficient number of new searchable documents become available for pre-searching.

Figure 4:
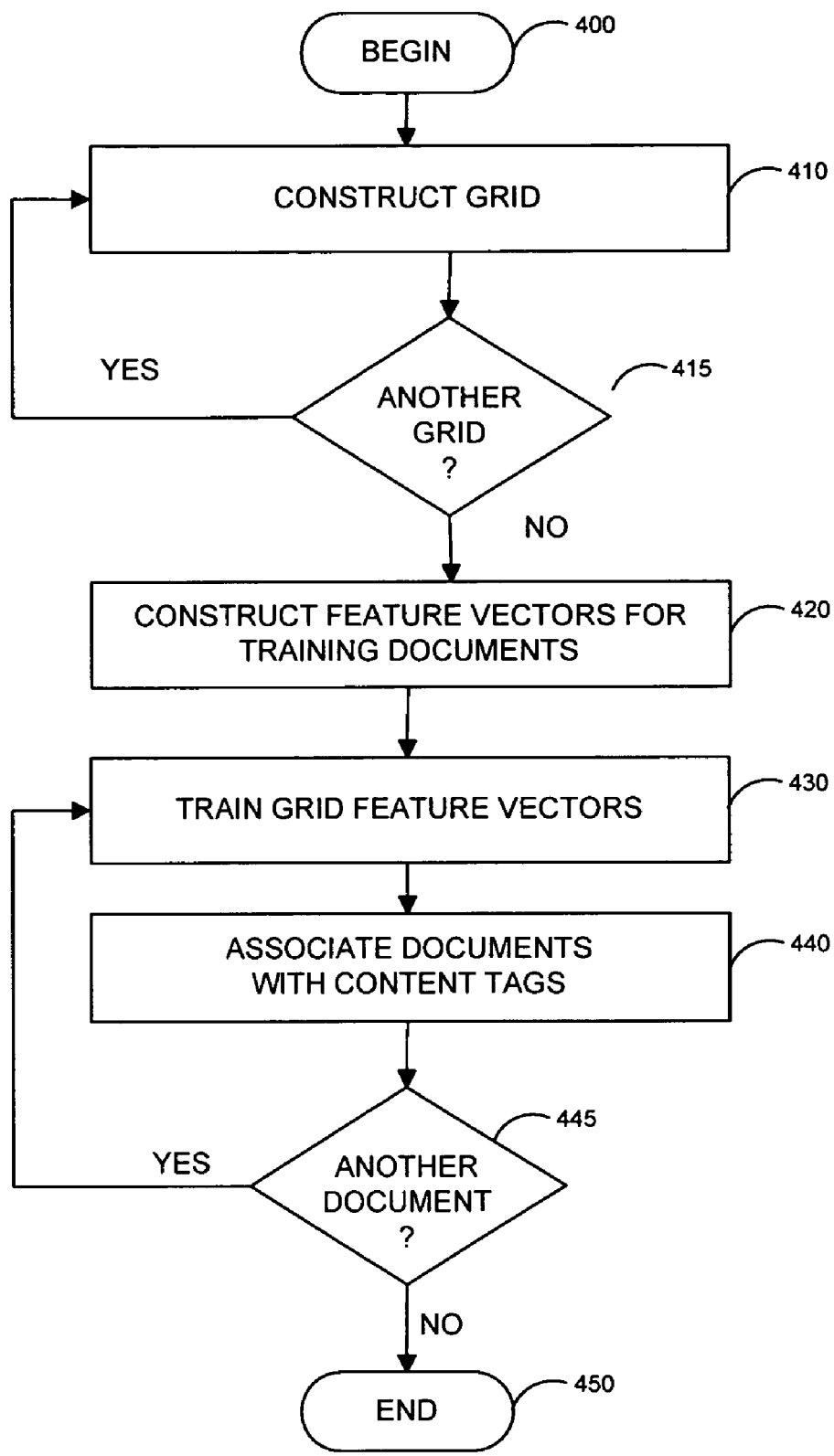
FIG. 4 is a flow chart illustrating a method for constructing a concept space grid and associating documents with tiles in the concept grid according to an embodiment of the invention.

FIG. 4 depicts a flow chart of an embodiment of the invention that incorporates the tasks described above. First, one or more grids spanning content space are constructed 410. In the embodiment shown in FIG. 4, the number of content tiles is selected prior to determining the number of basis vectors. Next, a group of training documents is searched to identify the words and word phrases that will be used as the basis vectors for training the content space grids. Using the basis vectors, a feature vector is constructed 420 for each training document. The training document feature vectors are then used 430 to train the grid feature vectors for each content tile. After the grid feature vectors are trained, a desired searchable document collection is pre-searched to index each document based on the keywords in the document. During the pre-search, the documents are also associated 440 with any appropriate content tiles. The concept space grids and indexed documents can now be used to respond to any search queries submitted by a user.

This invention will be further described below in an embodiment involving an inverted index for holding the results of a pre-search. This embodiment is only illustrative, however, and other data structures and/or methods for storing the results of a pre-search may also be used with this invention.

VII. Tracking User Events

In addition to categorizing documents, content grids can also be used to categorize user events and maintain a history of the user events. In an embodiment, a user event corresponds to any document visited or accessed by a user. In such an embodiment, the user event can be tracked using any content tags associated with the document.

In another embodiment, a user event corresponds to a search query. In such an embodiment, search queries provided by a user can be associated with one or more content tiles from the content grid based on the keywords in the search query. One way to analyze the search query is to identify any words or word phrases that correspond to the keyword basis vectors used in forming a feature vector. The search query is analyzed by reading the search query from left to right. If the basis vectors include multi-word phrases, the analysis starts with the longest possible phrase, and then shorter phrases are searched to identify any potential basis vector matches. As an example, in an embodiment the basis vectors can include words, word pairs, and word triplets. To analyze a search query, the first three words starting from the left of the query would be compared with any three word basis vectors. If no match is found, the first two words would then be compared with two word basis vectors, and then the first word compared with the one word basis vectors. As soon as a match is found, the analysis would move forward in the search query past the word(s) comprising the basis vector. This process is repeated until all words are identified as either belonging to one or zero basis vectors.

After identifying any basis vectors present in the search query, any content tiles that correspond to the basis vector are determined. In an embodiment, the content tiles corresponding to a basis vector are determined by first calculating a dot product between the basis vector and the grid feature vector for each content tile "i". The value of this dot product $n_i$ represents the overlap between the basis vector and the content tile "i". The dot product values $n_i$ for the basis vector with each grid feature vector are then used to calculate a "certainty value" for each content tile using the formula $$C = \log(N_c) + \sum_j \frac{n_i}{n} \log\left(\frac{n_i}{n}\right)$$

where C is the certainty, $N_c$ is the total number of content tiles in the grid, $n_i$ is the dot product value of the basis vector with the grid feature vector for content tile "i," and n is the sum of the dot products of the basis vector with the grid feature vector for all content tiles. Based on the above formula, basis vectors which overlap significantly with only one or a few basis vectors will have higher certainty values.

The calculated certainty values can be used to determine whether a keyword in a search query is associated with one or more content tiles. In an embodiment, if the certainty value for a given content tile is above a threshold value, the content tile is associated with the search query. The search query is then modified to include the location tag assigned to the content tile. Otherwise, the content tile is not associated with the search query. In another embodiment involving multiple grids with different resolutions, multiple thresholds can be used to determine which content tiles to associate with the search query. If the certainty is above a first threshold, the location tag for the content tile is added to the search query. If the certainty is below the first threshold but above a second threshold, a location tag for a content tile from a lower resolution grid can be added to the search query. In this situation, the search query is effectively associated with a more general type of content, as opposed to the more specific content found in the content tiles of the higher resolution grid. If the certainty is below all threshold values, then the search query is not modified.

In still another embodiment, the above calculations for identifying basis vectors that have strong overlap with the grid feature vectors of content tiles can be performed as part of the pre-search. In this embodiment, the overlap and certainty calculations are performed prior to receiving a search query. When a certainty calculation shows that a basis vector should be associated with a content tile, the content tag for that content tile is associated with the basis vector keyword in an index. The index can be the same inverted index used to associate documents with content tiles, or it can be a separate data structure. In this type of embodiment, when a search query is submitted to a search engine, any content tiles that should be associated with the search query can be identified by simply consulting this previously generated index.

IX. Selecting Content Tags for Modifying a Search Query

After tracking a user event, any content tags corresponding to the user event can be accumulated to maintain a history of user preferences. In an embodiment, the preferences of a user can be tracked by storing content tags associated with user events in a queue, such as a first-in-first-out queue. In such an embodiment, when a user submits a search query, any content tags stored in the queue could be added to the search query.

Preferably, a queue for storing content tags can represent a short term queue having a limited number of locations for storing content tags. When all locations in the short term queue are filled with content tags, the next user event associated with a content tag will cause the oldest content tag to be dropped from the queue. The size of a short term queue could be adjusted to retain a desired number of content tags in the queue. In an embodiment, the short term queue can be sized to hold the content tags from the 20 most recent user events. In another embodiment, such as an embodiment for use on a machine with limited memory resources, content tags from only the 5 most recent user events can be stored. In still another embodiment, a short term queue can be sized to hold an absolute number of content tags, such as 20 content tags. In such an embodiment, if a user event is associated with more than one content tag, each associated content tag is added to the queue. If all positions in the queue were filled, this will cause an equal number of stored content tags to be dropped from the queue. Note that "dropping" a content tag out of the queue is equivalent to deciding that a content tag exceeds a desired threshold value for retaining the content tag. In an alternative embodiment, content tags that have been in the queue for longer times can be given a reduced weight when added to a user search query.

In another embodiment, content tags can be selected for inclusion in a search query based on the frequency of occurrence of a content tag in a user event. This can also be viewed as a longer term tracking of user events. In such an embodiment, a history of user interests or preferences can be maintained by constructing an array or histogram to store frequency data for content tags. Each time a user event occurs that is associated with a content tag, the array or histogram element corresponding to the content tag is incremented. When a search query is received, any content tags with higher than a threshold value can be included in the modified search query. In an alternative embodiment, each array or histogram element can have a maximum value. When the array element for a content tag reaches the maximum value, any subsequent user events corresponding to the content tag do not cause an increase in the value of the array element. Instead, all other array elements are decreased by the desired amount.

In still another embodiment, content tags corresponding to different resolution levels in content space can be tracked at the same time. Tracking content tags corresponding to different resolutions allows for tracking of additional information about user preferences.

In yet another embodiment, various strategies for tracking user events can be combined to maintain a history of user preferences. For example, in an embodiment where content tags of two differing resolutions are tracked, higher resolution or primary content tags can be used to track short term preferences while lower resolution or secondary content tags can be used to track longer term user preferences. When a user event occurs, any content tags associated with the user event are tracked. If the user event is associated with one or more primary content tags, these content tags are added to a short term queue, such as a first-in-first-out queue. Additionally, a lower resolution or secondary content tag associated with each primary content tag can be determined. The secondary content tags are used to increment corresponding elements in a frequency array or histogram.

The content tag information from both the short term queue and the long term frequency array can be combined to select content tags that should be included in a modified search query. In this embodiment, each location in the higher resolution content grid can be viewed as corresponding to a content space location i. For each potential content space location i, a preference value $p_i$ is computed:

$$p_i = \alpha \cdot L_{li} + \begin{cases} \beta \cdot \exp(-\delta \cdot H_i), & \text{match} \\ 0, & \text{nomatch} \end{cases}$$

where $\alpha$, $\beta$, and $\delta$ are scaling factors that can be tuned by an automated system, $L_{li}$ is the value in the frequency array for a low resolution tile corresponding to content space location i, and $H_i$ is the position in a first-in-first-out queue for the primary content tag corresponding to content space location i. The scaling factor $\delta$ can be thought of as a "decay time," where a content tag has less impact on the value of $p_i$ as the content tag moves farther down in the queue due to addition of content tags from more recent user events. If a primary content tag corresponding to content space location i is not present in the short term queue, then there is no match and the short term queue portion of the calculation is set to zero.

Using the above formula, if $p_i$ is greater than a threshold value, the primary and secondary content tags corresponding to position i are added to the search query. Note that if a given secondary tag occurs frequently enough, the above formula could produce a value of $p_i$ above the threshold for a content space location that is not present in the short term queue via its primary content tag.

In an alternative embodiment, content tags can be selected based on stored values for frequently used keywords. If a keyword occurs frequently, a list of content tags associated with a keyword can be stored in an index. When a search query is a received from a user, the user preference content tags can be compared with the known content tags for the keyword. If none of the user preference content tags match the known content tags for the keyword, the search query is not modified, as there is no correlation between the keyword and the user preferences. In this type of embodiment, some keywords will not have a stored list of associated content tags. If a query contains a keyword that does not have a stored list of associated content tags, the user preference content tags are used to modify any received search queries. In still a further embodiment, a search query can also be modified to include content tags corresponding to nearest neighbor content locations.

VII. Matching Documents to a Search Query

Content tags added to a search query can be used to modify the response to the query in various ways. In an embodiment, the content tags are used as mandatory terms. Only documents that match the content tags in the search query are provided to the user as matches. In such an embodiment, the content tags are treated similarly to other terms in the search query. For example, if a search query is modified to include one or more content tags, then only documents associated with at least one of the content tags will be returned as a search result.

In another embodiment, the content tags in the search query are used only to prioritize the documents matching other terms in the search query. In such an embodiment, the matching the content tags in the search query does not include or exclude a document. Instead, documents which match a content tag are assigned an increased value in determining the order to display results to the user. Various schemes for prioritizing the display of search results are possible. In one embodiment, the display priority for a document can be based on the total number of matching search terms in a search query. In this situation, documents associated with a content tag would receive the same priority increase as if any other search term were matched. In another embodiment, the priority increase for matching a content tag can be separate from the priority increase from matching a content tag. In still another embodiment, the increase in priority value for matching a content tag from a higher resolution grid can be greater than the increase in priority value for matching a location tile in a lower resolution grid.

In still another embodiment, the results of a search query can be provided in a format that allows a user to switch from prioritizing based on content tags to requiring content tags as part of a search query match. As an example, consider an initial search query that matches a number of documents, with two of the matching documents also matching separate content tags that were added to the search query. Due to the increased priority from matching a content tag, the two documents matching the content tags are displayed to the user at the top of the results list. Additionally, the two documents matching a content tag from the search query also have an additional link for requesting additional matches having similar content (i.e., documents that are associated with nearby content tiles). If the user selects the link for additional matches, the search query would be submitted again with two differences. First, any content tags added to the search query would be replaced with the content tag selected by the user, plus the content tags for all nearest neighbor content tiles. The search would then be processed under the constraint that a document must be associated with one of the content tags in the search query to be displayed as a match.

Figure 5:
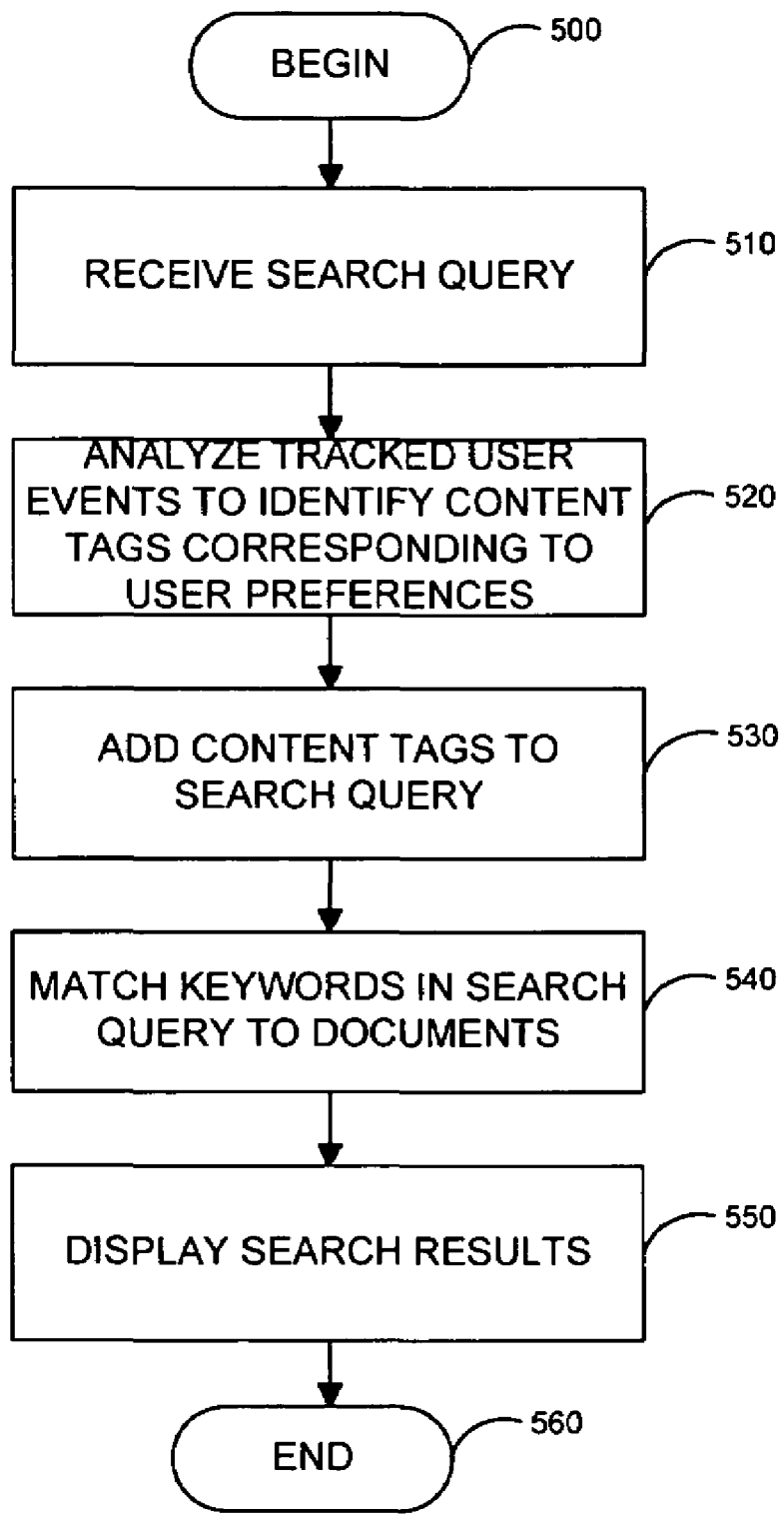
FIG. 5 is a flow chart illustrating a method for performing a context based search according to an embodiment of the invention.

FIG. 5 depicts a method for returning search results to a user according to an embodiment of the invention. When a search query is received 510 by a search engine, any tracked user event data for the user is analyzed 520 to select content tags corresponding to user preferences. The search query is then modified 530 to include the selected content tags. The search query is then matched 540 to one or more documents based on the content tags and other keywords contained in the search query. When the documents are displayed, documents matching 540 one of the content tags corresponding to a user interest or preference can be displayed 550 at the beginning of the list using any of a variety of ranking methods. For example, the documents matching the most user preference content tags could be listed first, or the documents matching the content tag with the highest resolution could be listed first.

VII. Harvesting and Distributing User Preference Information

In an embodiment, the tracking data for user preferences can be stored in a file in a memory area or device on a user's local machine. In another embodiment, the tracking data for user preferences can be stored at a central location and then distributed to any machine where a user provides identifying data (such as a password login). If tracking data for a user is stored at a central location, user events must be harvested from any local machines where the user can be identified. For example, tracking of the user event can be handled using a site redirect method. When a user specifies a document to view, such as by clicking on a link on a web page, the user can first be redirected to a separate recording web site. The recording web site notes the page that the user is going to visit, and then passes the user on to the desired document. Other methods for tracking a user event will be apparent to those of skill in the art.

In addition to harvesting user event data for tracking, the tracked data should be distributed to any local machine where a user can be identified. In an embodiment, the user tracking data can be passed to a local machine as part of a cookie. Because the tracking data for a user can be expressed as a series of content tags, the tracking data can be passed to a local machine in a compact form. For example, each time a user begins using a particular local machine, a cookie can be passed to the machine containing a series of content tags. These content tags can represent selected content tags that should be included with each search query submitted by the user. Alternatively, the content tags can represent the current contents of a short term queue.

VII. Tracking User Preferences With Alternate Types of Content Tags

The above embodiments have described tracking user preferences and modifying search queries based on content tags associated with one or more grids spanning a content space. In other embodiments, the content tags can be associated with other types of data structures that span a desired content space. For example, a node and branch structure can be used to represent a content space, where higher level nodes correspond to large groupings of subject matter in content space. Each higher level node can have one or more branch nodes that represent a smaller portion of content space. In another embodiment, an arbitrary content structure trained using a neural network method can be used to span a content space. Preferably, the structure used to span the content space is capable of having both a higher resolution and lower resolution structure. This allows for a convenient way modeling of a user's preferences or interests using a combination of a short term and long term memory model, such as by combining a first-in-first-out queue with a frequency based array or histogram.

Having now fully described this invention, it will be appreciated by those skilled in the art that the invention can be performed within a wide range of parameters within what is claimed, without departing from the spirit and scope of the invention.

What is claimed is:

1. A computer implemented method of performing a search, comprising:
   associating a plurality of user events for a user with content tags according to a pre-searching procedure, wherein the pre-searching procedure comprises:
      constructing feature vectors for one or more documents that are searched within a document collection, the feature vectors are determined based on a frequency of occurrence of a word or word phrase within the one or more documents of the document collection;
      providing a content space grid comprising content tiles, wherein each of the content tiles is associated with a grid feature vector of a plurality of grid feature vectors and is arranged within the content space grid according to subject matter of words or word phrases represented by each grid feature vector of the plurality of grid feature vectors, wherein the arrangement ensures that the content tiles shared a common boundary in the content space grid have related content associated therewith, and wherein the content tags are assigned to each of the content tiles, respectively, and identify locations of the content tiles within the content space grid;
      associating the content tiles with the one or more documents in the document collection by comparing the feature vectors of the one or more documents and the plurality of grid feature vectors of the content tiles and, based on the comparison, identifying the feature vectors corresponding to one or more grid feature vectors of the plurality of grid feature vectors;
      tracking the plurality of user events affecting the one or more documents; and
      associating the content tags with the one or more documents in accordance with the associated content tiles and updating the content tags associated with the one or more documents upon determining that the one or more documents are accessed by the tracked plurality of user events;
   receiving a search query from the user;
   selecting one or more of the associated content tags according to characteristics of the plurality of user events;
   modifying the received search query with the one or more selected content tags;
   comparing the modified received search query against the one or more documents of the document collection to find a match; and
   at least temporarily storing the one or more matching documents in association with the modified received search query on computer storage medium.

2. The computer implemented method of claim 1, wherein selecting one or more of the associated content tags comprises:
   maintaining a queue of the content tags associated with the user events invoked by the user;
   determining a threshold position in the queue based on a time-frame when the user events were harvested; and
   selecting the content tags within the queue, having a position less than the threshold position.

3. The computer implemented method of claim 1, wherein selecting one or more of the associated content tags comprises:
   measuring the frequency of occurrence by which user events of the plurality of user events are associated with each of the content tags;
   determining a threshold frequency value based on the measured frequency of occurrence of the user events; and
   selecting the content tags having the frequency of occurrence greater than the threshold frequency value.

4. The computer implemented method of claim 1, wherein selecting one or more of the associated content tags comprises:
   maintaining a queue of primary content tags having a first resolution associated with user events for the user, each primary content tag being associated with one of the content tiles;
   tracking a frequency value for secondary content tags having a second resolution, each secondary content tag being associated with a plurality of content tags having the first resolution;
   determining a threshold preference value;
   calculating a preference value for each of the content tiles; and
   selecting a primary content tag and an associated secondary content tag for each of the content tiles having a preference value above the threshold value.

5. The computer implemented method of claim 4, wherein the preference value for each of the content tiles is calculated using the formula:

$$p_i = \alpha \cdot L_{ti} + \begin{cases} \beta \cdot \exp(-\delta \cdot H_i), & \text{match} \\ 0, & \text{nomatch} \end{cases}$$

where α, β, and δ are scaling factors, $L_{l_i}$ is a frequency value for a secondary content tag corresponding to the primary content tag for location i, and $H_i$ is a position in a short term queue for the primary content tag corresponding to one of the content tiles.

6. The computer implemented method of claim 1, wherein a user event of the plurality of user events corresponds to a user visiting one or more documents of the document collection.

7. The computer implemented method of claim 1, wherein a user event of the plurality of user events corresponds to a search query received from the user.

8. The computer implemented method of claim 1, wherein modifying the received search query with the one or more selected content tags further comprises modifying the received search query with one or more content tags corresponding to the content tiles in the content space grid, wherein the corresponding content tiles share a common boundary with the content tiles associated with the one or more selected content tags.

9. The computer implemented method of claim 1, wherein selecting one or more of the associated content tags comprises:
    utilizing an inverted index to identify one or more stored content tags corresponding to each keyword in the received search query; and
    selecting one or more associated content tags that match at least one stored content tag.

10. A computer readable medium storing computer executable instructions for performing the method of claim 1.

11. One or more computer-readable media having computer-executable instructions embodied thereon that, when executed, perform a method for performing a document search, the method comprising:
    providing a user event history comprising a plurality of stored content tags, wherein providing the user event history comprises:
        constructing feature vectors for one or more documents that are searched within a document collection, the feature vectors are determined based on a frequency of occurrence of a word or word phrase within the one or more documents of the document collection;
        providing a content space grid comprising content tiles, wherein each of the content tiles is associated with a grid feature vector of a plurality of grid feature vectors and is arranged within the content space grid according to subject matter of words or word phrases represented by the grid feature vector of the plurality of grid feature vectors, wherein the arrangement ensures that the content tiles shared a common boundary in the content space grid have related content associated therewith, and wherein the content tags are assigned to each of the content tiles, respectively, and identify locations of the content tiles within the content space grid;
        associating the content tags with each of the one or more documents in the document collection according to grid feature vectors, of the plurality of grid feature vectors, associative with the content tiles to which the content tags are assigned;
        tracking a plurality of user events affecting the one or more documents; and
        storing the content tags associated with the one or more documents indicated by the user event history as the stored content tags;
    analyzing the user event history to select one or more of the stored content tags;
    modifying a search query to include the one or more selected stored content tags; and
    matching the modified search query with the one or more documents utilizing the at least one selected content tag.

12. The one or more computer-readable media of claim 11, wherein the one or more documents each contains a plurality of keywords that, incident to performing the pre-search process, are entered to a document-retrieval inverted index.

13. The one or more computer-readable media of claim 12, further comprising utilizing the document-retrieval inverted index to provide the one or more matching documents in response to the modified search query.

14. The one or more computer-readable media of claim 13, where the one or more matching documents are ordered on a prioritized list, wherein the ordering is based on a number of content tag matches for each of the one or more documents.

15. A computer system for performing context based document searches comprising:
    a processing unit coupled to a computer storage medium, the computer storage medium having stored thereon a plurality of computer software components executable by the processing unit, the computer software components comprising a grid builder, a content tag assignment mechanism, a feature association mechanism, a user event tracker, and a keyword matching mechanism:
    the grid builder constructs a content space grid comprising content tiles, each of the content tiles is associated with feature vectors and is arranged according to subject matter of words or word phrases represented by the feature vectors, wherein the feature vectors of each of the content tiles are related to a position of the content tiles on the content space grid, and wherein the position ensures that the content tiles shared a common boundary in the content space grid have related words or word phrases associated therewith;
    the content tag assignment mechanism assigns a content tag to each of the content tiles according to the feature vectors, wherein the content tag is assigned to each of the content tiles, respectively, and identifies locations of the content tiles within the content space grid;
    the feature association mechanism assigns a series of feature values for a document according to a content therein, associating the document with one or more content tiles by comparing the series of feature values for the document against the feature vectors of the content tiles, and assigning the content tag to the document based on the content tiles associated therewith based on the comparison;
    the user event tracker maintains a history of user events that indicates documents by updating content tags corresponding to each content tile and selecting the content tags corresponding to user preferences; and
    the keyword matching mechanism matches a content tag appended to a search query with a document, wherein matching comprises comparing the content tag appended to the search query against the content tag assigned to each of the one or more content tiles to find at least one corresponding content tile and to identify the document associated therewith.

16. The computer system of claim 15, further comprising a search query modification mechanism to identify a content tag and to modify the search query to include the identified content tag.

17. The computer system of claim 16, wherein identifying a content tag comprises receiving a selected content tag from the user event tracker.

18. The computer system of claim 15, further comprising a document indexing mechanism to store associations between content tags and documents that are assigned according to a pre-search process.

19. The computer system of claim 15, wherein the grid builder further configured to determine feature vectors by identifying words or phrases within training documents, the feature vectors establishing the position of the content tiles on the grid.

20. The computer system of claim 19, wherein the feature association mechanism further configured to associate the document with one or more content tiles upon determining whether the series of feature values for a document satisfy a similarity threshold value.

* * * * *